United States Patent
Kamijoh et al.

(10) Patent No.: US 7,667,217 B2
(45) Date of Patent: Feb. 23, 2010

(54) APPARATUS FOR OBSERVING AND CAPTURING LATENT IMAGES ON OBJECTS, AND METHOD FOR USING SAME

(75) Inventors: Noboru Kamijoh, Kanagawa-Ken (JP); Toshitaka Imai, Kanagawa-Ken (JP); Kazumasa Ochiai, Kanagawa-Ken (JP); Konichi Kamijoh, Kanagawa-Ken (JP)

(73) Assignee: International Business Machines Corporation, Armonk, NY (US)

( * ) Notice: Subject to any disclaimer, the term of this patent is extended or adjusted under 35 U.S.C. 154(b) by 37 days.

(21) Appl. No.: 12/166,107

(22) Filed: Jul. 1, 2008

(65) Prior Publication Data
US 2009/0016568 A1  Jan. 15, 2009

(30) Foreign Application Priority Data
Jul. 13, 2007  (JP) .................. 2007-184194

(51) Int. Cl.
*G03B 15/00* (2006.01)
*G06K 7/10* (2006.01)
*G06K 9/00* (2006.01)

(52) U.S. Cl. ............... 250/566; 250/458.1; 250/461.1; 235/468

(58) Field of Classification Search ............ 250/208.1, 250/552, 566, 458.1, 461.1; 235/468
See application file for complete search history.

(56) References Cited

U.S. PATENT DOCUMENTS

| | | | | |
|---|---|---|---|---|
| 4,392,053 A * | 7/1983 | Bockholt | ............ | 235/462.32 |
| 6,788,293 B1 * | 9/2004 | Silverbrook et al. | ........ | 345/173 |
| 7,498,075 B2 * | 3/2009 | Bloomberg et al. | ......... | 428/201 |
| 7,520,443 B2 * | 4/2009 | Kamijoh et al. | ............. | 235/494 |
| 2004/0041030 A1 * | 3/2004 | Nimura et al. | ............. | 235/468 |
| 2005/0117066 A1 * | 6/2005 | Kamijo | ..................... | 348/699 |
| 2007/0138286 A1 * | 6/2007 | Kamijoh et al. | ........ | 235/462.04 |
| 2008/0151280 A1 * | 6/2008 | Kamijo et al. | ............... | 358/1.9 |
| 2009/0016568 A1 * | 1/2009 | Kamijoh et al. | ............. | 382/100 |
| 2009/0050700 A1 * | 2/2009 | Kamijoh et al. | ............. | 235/440 |

* cited by examiner

*Primary Examiner*—John R Lee
(74) *Attorney, Agent, or Firm*—Libby Z. Handelsman; Suiter Swantz pc llo

(57) ABSTRACT

An apparatus for easily shooting an invisible image (such as an invisible two-dimensional bar code) latent on an object. The operation of the apparatus is made intuitive and simple and may be incorporated into cameras peripheral to computers and mobile telephones. A novel framing and focusing system is also disclosed.

10 Claims, 6 Drawing Sheets

APPARATUS FOR OBSERVING AND CAPTURING LATENT IMAGES ON OBJECTS, AND METHOD FOR USING SAME

CROSS-REFERENCE TO RELATED APPLICATIONS

The present application claims the benefit under 35 U.S.C. § 119, and incorporates herein in its entirety, Japanese Application Serial Number 2007-184194, filed Jul. 13, 2007, entitled Apparatus Capable Of Easily Shooting Invisible Image Latent On Object While Observing The Image, And Method For Using The Same.

TECHNICAL FIELD

The present disclosure generally relates to the field of an apparatus capable of observing and capturing latent images and a method for using the same.

BACKGROUND

The present invention relates to an apparatus capable of easily shooting an invisible image latent on an object while observing the image, and a method for using the same.

As computer-aided editing and publishing for newspapers and magazines such as desktop publishing (DTP) are widespread, articles and photographs printed on newspapers and magazines are stored in a server as digitized original content. For a fee such content is available over the INTERNET and may be downloaded to personal computers (PCs), personal digital assistants (PDAs), special-purpose apparatuses, and mobile phones and the like. However, paper as medium is still popular with consumers as it provides a level of access and convenience familiar to many users. Thus, content publishers are desirous of utilizing there unutilized or under utilized digital content in conjunction with print media.

For example, it has become common to use a camera provided in a mobile phone to read a QR code (Quick Response code consisting of a two-dimensional matrix) printed on an advertisement or a magazine and providing access to a website. For example, a service that allows listening to sample music from newspapers and magazines is in use.

A QR code printed on a newspaper or a magazine may detract from the pictorial appearance of a printed publication. For this reason, an electronic scrapping system has been developed. This system uses an invisible bar code technique providing invisibility under the normal ambient light or environmental light alone, and allows an invisible QR code to be freely placed anywhere on or within a printed publication or item.

A Published Unexamined Patent Application No. 2006-229894 (published on Aug. 31, 2006) proposes an "electronic scrapping system" invented as a method for combining a printed material of a physical medium such as paper, plastic, or cloth and digital content. According to the principle of this technique, stealth ink or invisible ink that appears transparent to the naked eye is used on a conventional or unconventional printed material. With this ink, content-related information is additionally printed as a two-dimensional (2D) bar code invisible in its normal state, so that the information can usually be kept latent (hidden) on the surface of the printed material.

The presence of this information can be revealed according to the characteristic of the information that it "luminesces" or "reacts" with to fluoresce or absorb light by the use of a digital camera-equipped mobile phone or the like that supports the electronic scrapping system. The use of ultraviolet or infrared light may also be utilized. This information and related information are presented and used along with normal visible images. Based on the proposed method, various services can be provided by associating this information with original digital content in a server.

With this method, invisible information can be embedded anywhere such as in text, photographs, and illustrations without worrying about the appearance and layout of the visible information or visible images on a printed material. This enables the creation of hyperlinking from any item and allows for the creation of a hybrid publications that provide additional value to printed material.

For a conventional QR code reader, a digital camera-equipped mobile phone is generally used. A QR code is indirectly displayed on a screen of a mobile phone (commonly displayed on a liquid crystal display) to shoot its image, which is then decoded with QR code reader software included in the mobile phone. Such a function is included as standard in most camera-equipped mobile phones because of their ability to directly connect to the Internet.

However, it is necessary to frame and focus the image containing the latent image. Thus, in a preferred embodiment of the present invention a display is utilized (most mobile telephones include a display). Tripods or related hardware and software based stabilization and framing techniques may also be utilized.

In addition, especially when the object is a printed material with a wide area such as a newspaper, the need of indirectly observing the display on the screen makes it difficult to locate and resolve wide areas of information containing a latent image (newspapers and the like.

On the other hand, if it is desired that information that could be obtained with a mobile phone be used in a personal computer (PC), a USB camera or the like is generally used. A QR code on printed material may be imaged (shot) with a USB camera held over the QR code, and processed with QR code reader software installed in the PC. Additionally, with a conventional USB camera, the distance and angle between the camera and the object vary with the way the user holds the USB camera. To prevent shooting a distorted or out-of-focus image (where minimal depth of field exists), it is necessary to set a camera lens perpendicular to the plane of the object while framing and focusing the image. Co-owned published unexamined Japanese Patent Application No. 2006-229894 (published on Aug. 31, 2006) is incorporated herein by reference in its entirety. It is aimed to provide a tool that can be affordably offered to and easily used by even users without a mobile phone and users unfamiliar with operation of a mobile phone.

SUMMARY

According to the present invention, there is provided an apparatus capable of shooting an invisible image luminously visualized on an object while observing the position of the invisible image latent on the object. According to this apparatus, a base body of the apparatus can be placed directly on the object. Through an observation window, a visible image existing on the object can be directly observed by taking ambient light, and the invisible image luminously visualized on the object by light from a light-emitting body can be directly observed.

It is to be understood that both the foregoing general description and the following detailed description are exemplary and explanatory only and are not necessarily restrictive of the present disclosure. The accompanying drawings, which are incorporated in and constitute a part of the specification, illustrate subject matter of the disclosure. Together, the descriptions and the drawings serve to explain the principles of the disclosure.

BRIEF DESCRIPTION OF THE DRAWINGS

The numerous advantages of the disclosure may be better understood by those skilled in the art by reference to the accompanying figures in which.

Figure 1:
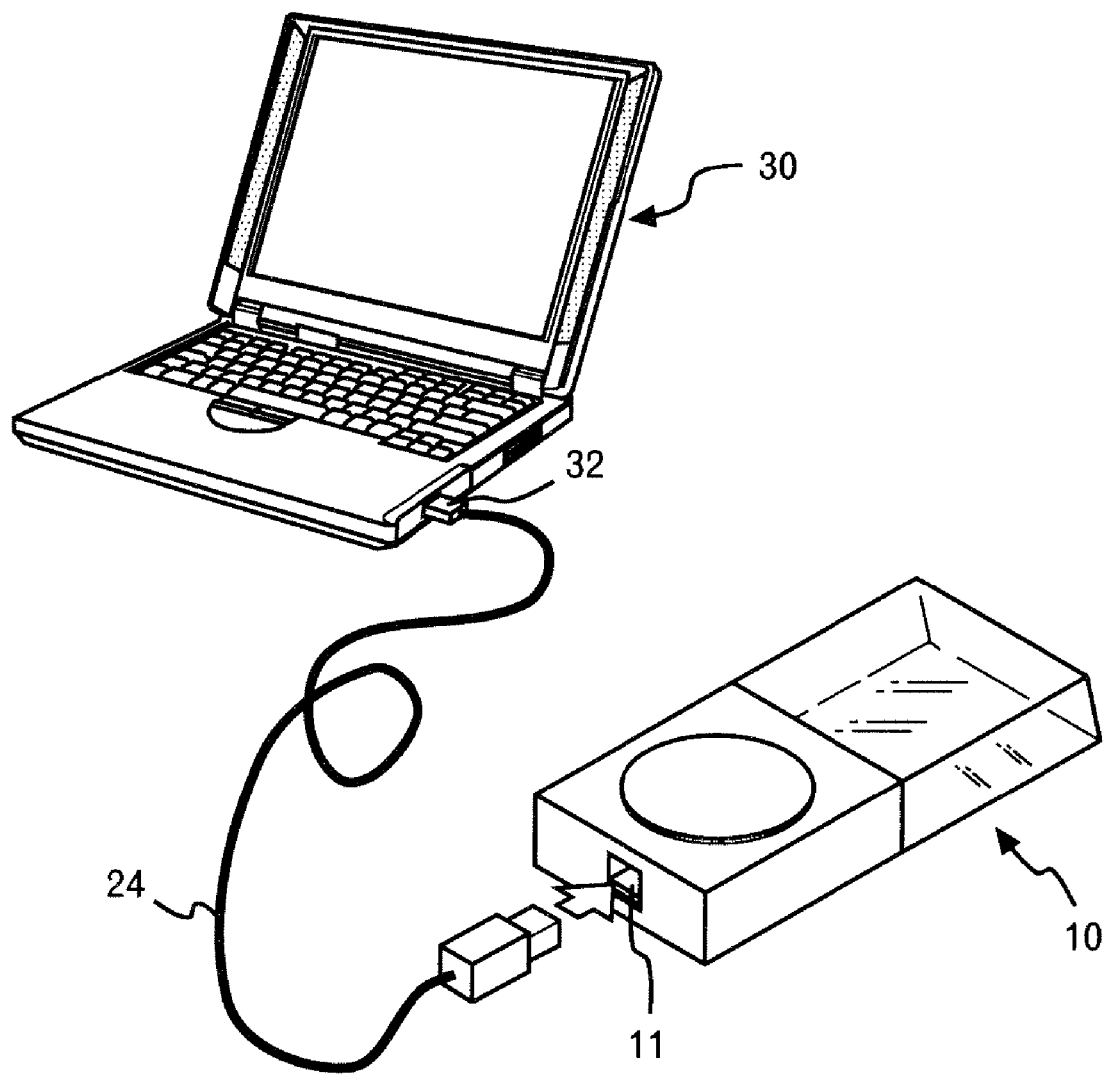
FIG. 1 is a diagram showing an embodiment in which a portable 2D bar code bookmarker, which is an apparatus capable of shooting an invisible image according to the present invention, is used.

DESCRIPTION OF SYMBOLS 10 portable 2D bar code bookmarker
11 USB connector (exemplary output connector)
12 base body
13 observation window
14 camera
15 black light LED
16 mirror
17 optical system
18 switch
19 battery
20 substrate
24 USB cable
30 PC (exemplary external device)
32 USB port

DETAILED DESCRIPTION

Reference will now be made in detail to the subject matter disclosed, which is illustrated in the accompanying drawings.

An apparatus capable of shooting an invisible image, or a portable bookmarker, can be manufactured with a fewer parts and at a very low price.

FIG. 1 is a diagram showing an embodiment in which a portable 2D bar code bookmarker, which is an apparatus capable of shooting an invisible image according to the present invention, is used.

A portable 2D bar code bookmarker 10, which is the apparatus capable of shooting an invisible image according to the present invention, is usually used in standalone mode to shoot a QR code on a printed material and bookmark the QR code. The portable 2D bar code bookmarker 10 is then connected to a USB port 32 or the like of a PC 30 to transfer the shot image, which is processed there and used by an application in the PC 30. When the portable 2D bar code bookmarker 10 remains connected to the PC 30 with a USB cable 24 via a USB connector 11 (an exemplary output connector) provided on the portable 2D bar code bookmarker 10 itself, it can also be used as a QR code reader capable of handling visible images and invisible images. The PC 30 may be a wide variety of external devices such as a PDA.

Figure 2:
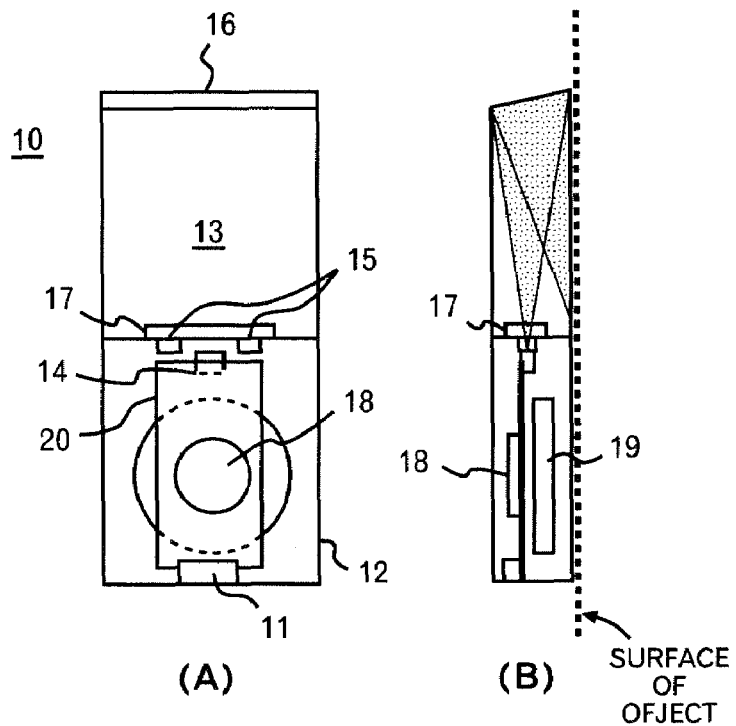
FIG. 2 is a diagram showing the configuration of the portable 2D bar code bookmarker, which is the apparatus capable of shooting an invisible image according to the present invention, including a front view (A) and a side view (B)

FIG. 2 is a diagram showing the configuration of the portable 2D bar code bookmarker 10, which is the apparatus capable of shooting an invisible image according to the present invention, including a front view (A) and a side view (B).

The portable 2D bar code bookmarker 10 is mainly configured with a base body 12 and an observation window 13. The portable 2D bar code bookmarker 10 includes a shooting camera 14 in which a CMOS sensor and so on are employed, and black light LEDs 15. The black light LEDs 15 are exemplary light-emitting bodies emitting invisible light (black light is a kind of ultraviolet light) that luminously visualizes an invisible bar code (an invisible image). For example, they can use an internal battery 19 or the like to realize the operation of luminously visualizing an invisible bar code.

The observation window 13 can be implemented to extend from the base body 12 so that the upper half coupled to the base body 12 has, for example, a rectangular and transparent loupe-like shape. However, as long as it can take ambient light therein to allow a visible image existing on the object to be directly observed there through, the observation window 13 does not necessarily need to have a transparent material substance. Also it does not necessarily need to be completely transparent but may be translucent. Further, it may be provided as a simple opening for allowing observation. A possible application may be to provide only part of the observation window 13 with the loupe function.

A camera 14 is fixedly set with respect to the base body 12. A mirror 16 is provided at an edge of the observation window 13, so that the light emitted from the black light LEDs 15 (the light-emitting bodies) is reflected and refracted by the mirror 16 and illuminates the surface of the object as illustrated in FIG. 2(B). In this manner, any invisible image latent (hidden) on the object can be illuminated to be luminously visible.

The spatial positioning of the mirror 16 and the black light LEDs 15 (the light-emitting bodies) is preferably set to allow the black light to evenly spread on part of the object covered by the observation window 13 when the base body 12 is placed directly on the object. While the two black light LEDs 15 are provided in FIG. 2 by way of example, those skilled in the art will be able to set various numbers and arrangements of black light LEDs.

The expression "placed directly on the object" covers not only the case where the base body 12 section is placed in contact with the object, but also the case where the observation window 13 section extending from the base body 12 is placed in contact with the object. FIG. 2(B) illustrates the case where the surface of the object contacts both the base body 12 and the observation window 13. However, a jig such as a spacer or a projection may be intermediately provided on the object. Thus, the requirement "directly" is satisfied if some contrivance is made to be able to keep a constant positional relationship (relative distance) between the camera and the part to be shot on the object so that no skill is required of the user for, e.g., focusing on the object; the expression "placed directly on the object" should be broadly construed within the scope of the concept of the present invention. In a similar sense, the meaning of that the camera 14 is "fixedly set" with respect to the base body 12 should be broadly construed.

Although not illustrated in FIG. 2(B), indirect light that is not directly cast from the black light LEDs 15 toward the mirror may also indirectly illuminate the object and contribute to the luminescence. Those skilled in the art will be able to illuminate the object according to an embodiment different from FIG. 2, for example in such a manner that the light emitted by turning on the black light LEDs is cast directly toward the object rather than toward the mirror.

The above-described components of the portable 2D bar code bookmarker 10 may be made as an integrated product to the extent possible for those skilled in the art.

Figure 3:
FIG. 3 is a diagram showing that the apparatus capable of shooting an invisible image according to the present invention, or the portable 2D bar code bookmarker, is used on an object and luminously visualizes an invisible image.

FIG. 3 is a diagram showing that the apparatus capable of shooting an invisible image according to the present invention, or the portable 2D bar code bookmarker, is used on an object and luminously visualizes an invisible image.

An image of a QR code is shown, which is luminously visualized by the light emitted when the user presses a switch 18 for a long duration on an article existing as a visual image on a newspaper (an object). The existence of the image of a QR code is often situated in association with surrounding articles.

Pressing the switch unit (the portion shown pressed with a finger and indicated by 18 in FIG. 2) provided on the base body for a long duration when the black light LEDs 15 is off causes the black light LEDs 15 to be turned on and remain on. That is, the switch 18 functions as a user-operated illumination switch. In the case such as where the object is a printed material with a wide area such as a newspaper, an action that the user takes first will be to intuit and find where in the wide area the printed information such as a bar code is printed in an latent (hidden) form. Pressing the switch unit (the portion shown pressed with a finger and indicated by 18 in FIG. 2) provided on the base body for a long duration when the black light LEDs 15 is on causes the black light LEDs 15 to be turned off. A detailed operational flow including how the switch is used will be summarized in FIG. 6 to be described later.

One application of the switch may be that the state in which the invisible light is being emitted is sensed only during the user's holding down the switch. Alternatively, the light may be on during the user's holding down the switch, and after the user releases the switch, the light may remain on for a certain limited period before turned off. Such applications can prevent forgetting to turn off the light, which will have great significance especially when the internal battery 19 with only a small size and capacity is used.

The observation window 13 is set to allow the luminously visualized invisible bar code (invisible image) to be directly observed there through. Since the observation window 13 takes the ambient light therein, a visible image such as text and photographs on the object can be directly observed there through. If the ambient light alone is not enough, an external or internal auxiliary light source may be added as appropriate. The fact that no special light sources are needed for the visible light contributes to a reduced number of parts and a very low-price mechanism.

The observation window 13 only needs to be set to allow direct observation, which is not limited to observation from the front but may be observation from at least one direction. For example, a peep-proof filter or the like may be provided on the observation window to limit permitted observation directions. Also, a filter for the observation window 13 may be provided to address adjustment of the intensity of the visible image, the intensity of the invisible image, and so on by changing the filter type.

Describing again with respect to FIG. 2, the visible image existing on the object and the luminously visualized invisible image are reflected by the mirror 16 and guided to an optical system 17 (typically a lens) provided in front of the camera, and further to the camera 14. In some cases, the optical system 17 may exist as part of the camera 14. Now, pressing the switch 18 for a short duration causes the QR code to be shot along with the background image (the visible image on the object). The image of the QR code can then be saved and accumulated as a file in memory provided on a substrate 20 in the base body 12. That is, the switch 18 functions as a user-operated shooting switch.

Once the image of the QR code can be located by pressing the switch 18 for a long duration, the shooting can be completed simply by another operation of finally pressing the switch 18 for a short duration. This ability to operate the same switch 18 only with a thumb is preferable from the viewpoint of usability. In addition, differentiating the two types of use only with the adjustment of the duration of pressing serves a reduced number of parts and a very low price. Of course, if the user's operation of shifting the position of the thumb is permitted and more preferable, the illumination switch and the shooting switch may be separately provided at different positions.

Figure 4:
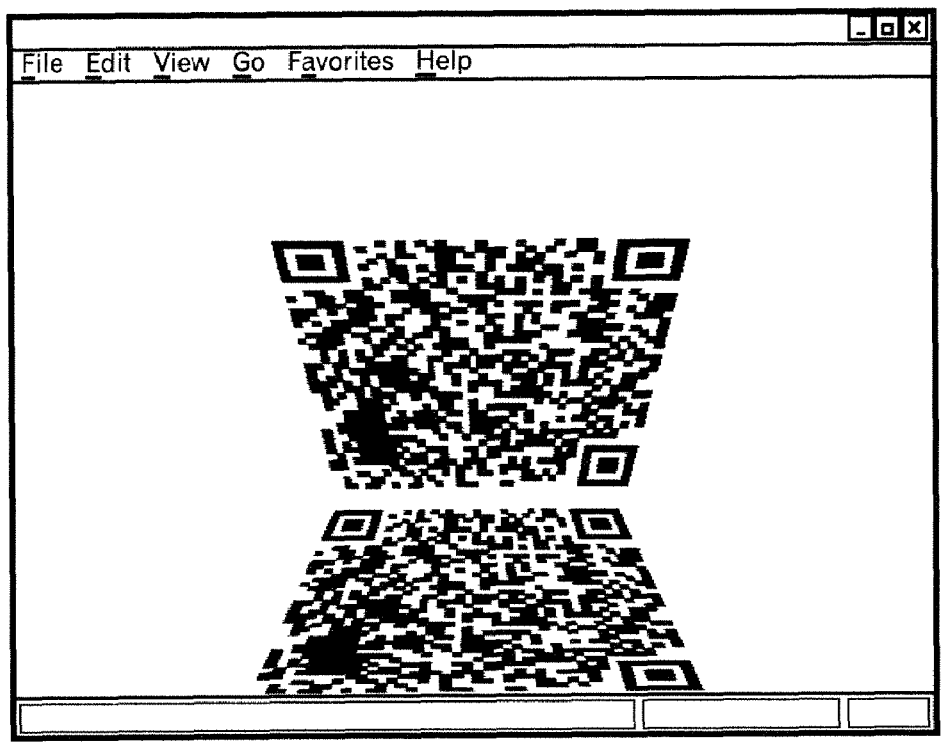
FIG. 4 is a diagram showing an exemplary mapping image of a luminously visualized QR code reflected by a mirror to be shot by a camera from an object.

FIG. 4 is a diagram showing an exemplary mapping image of the luminously visualized QR code reflected by the mirror to be shot by the camera from the object.

The image obtained via the mirror 16 is not the image directly observed through the observation window 13 but an image mapped from the surface of the object. That is, since the mirror 16 guides the light toward the optical system 17 and the camera 14, the resulting image is an image incident from the direction different from the observation direction through the observation window 13.

The portable 2D bar code bookmarker according to the present invention can be used by placing it directly on a QR code existing on an object such as a printed material. Therefore, the positional relationship (relative distance) can be kept constant between the camera and the part to be shot on the object. Since it is known in advance how the shot image will be mapped and how it will be distorted when captured, the spatial positional relationship can be accurately determined. This characteristic can be utilized to perform inverse operations with bookmarker software and reconstruct a correct image from the shot image for further use.

Figure 5:
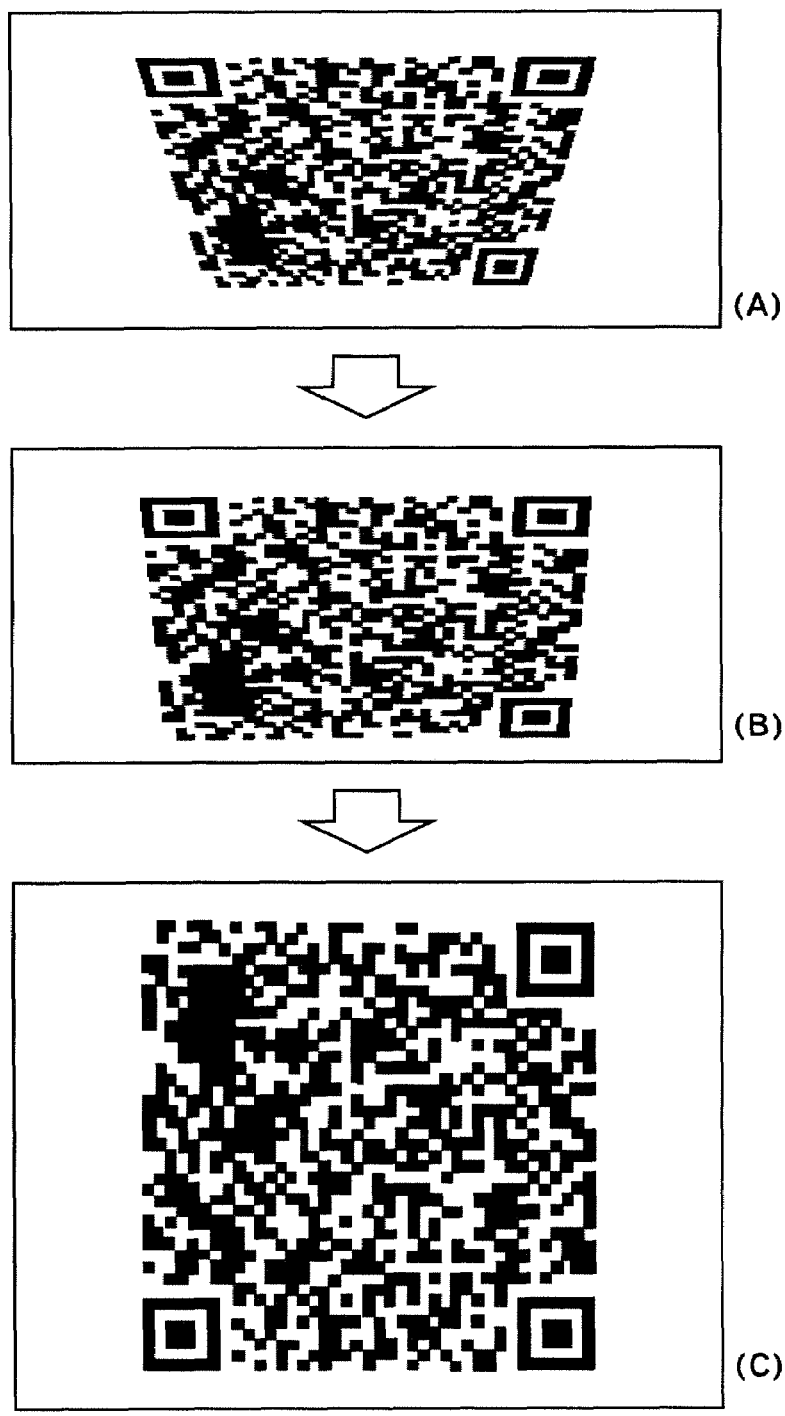
FIG. 5 is a schematic diagram depicting the process of performing inverse operations with bookmarker software and reconstructing a correct image latent on the object from the shot mapping image.

FIG. 5 is a schematic diagram depicting the process of performing inverse operations with the bookmarker software and reconstructing a correct image latent on an object from a shot mapping image.

First, the image reflecting on the mirror shown at the center in FIG. 4 is clipped out (A) and subjected to distortion correction in the lateral direction (B). It is then subjected to distortion correction in the longitudinal direction and turned upside down with mirror image correction (C).

If the image cannot be linearly converted, a conversion table may be provided in advance indicating where in the image before reflecting on the mirror the camera pixels correspond to, and the image may be reconstructed by referring to the conversion table.

Returning to FIG. 1, the USB port exists on the substrate 20 and operates as a mass storage class. Therefore, when a connection is made to the PC 30 via the USB port 11, the file of the shot image is viewed as in a removable disk as shown in FIG. 4. The bookmarker software installed in the PC 30 can use the method of the electronic scrapping system (Published Unexamined Patent Application No. 2006-229894) for this image to extract a part corresponding to the image of the QR code from the mixed content of the visible image and the invisible image. The extracted part can be processed with a QR code decoder and used by an application.

The function of performing inverse operations with the bookmarker software and reconstructing a correct image from a shot mapping image is implemented on the PC 30 (FIG. 1). Therefore, the portable 2D bar code bookmarker 10 may simply save the shot image in a distorted form in the memory.

The mirror 16 only needs to contain the luminously visualized invisible image. Those skilled in the art may appropriately adjust the angle of the mirror 16 within the scope of the technical concept of the present invention. Like a camera finder, a shooting frame may be provided on the upper surface of the observation window 13 as a guide to ensure that all the area of the luminously visualized invisible image falling within the frame is (supposed to be) reflecting on the mirror.

The portable 2D bar code bookmarker 10 is usually used in standalone mode for bookmarking information of interest on newspapers and magazines. Connected to the PC 30 with the USB connector 11 via the USB cable 24 on itself, the portable 2D bar code bookmarker 10 can read a QR code like a conventional USB camera. A memory card such as SD memory may be provided instead of the USB port, in which case data is transferred to the PC 30 via the memory card and used.

Although not shown, it is possible to allow the portable 2D bar code bookmarker to be used as (to double as) a general USB camera, such as by hinging the observation window 13 on the base body 12 so that the focus of the optical system 17 varies as the observation window 13 is tipped up with a hinge (without using the reflection function of the mirror 16, and therefore without focusing on the mirror 16). In this case, the optical system 17 is also capable of guiding those images that are not from the mirror 16 to the camera 14. Further, it will be easy for those skilled in the art to provide the optical system 17 with a variable focus mechanism.

All the spatial positional relationships with the object is based on the assumption that the base body 12 of the portable 2D bar code bookmarker 10 is placed directly on the object. Inside the apparatus of the portable 2D bar code bookmarker 10, the position of the shooting camera 14 is fixedly set with respect to the base body 12. Therefore, the user does not need to care for the adjustment of the focus on the image being shot (supposed to be shot). This enables manufacturing the bookmarker with a fewer parts and at a very low price. For example, a CMOS sensor camera of 350000 pixels was able to be included in a USB memory key of 1 GB and packaged.

With the present invention, QR codes printed on newspapers and magazines can be bookmarked whether they are visible or invisible, and thereafter the PC 30 or the like can be used to obtain desired articles or information, or buy related products or services. Since the image of a QR code is often situated in association with surrounding articles, the technical significance of capturing them together is great.

The portable 2D bar code bookmarker 10 may be connected to the PC 30 with the USB cable 24 and used for a service providing more detailed information or video from an educational book, or used for a system at a theme park etc. to read information from an invisible QR code printed on a ticket, a brochure, or possibly the back of one's hand and provide a new service.

Figure 6:
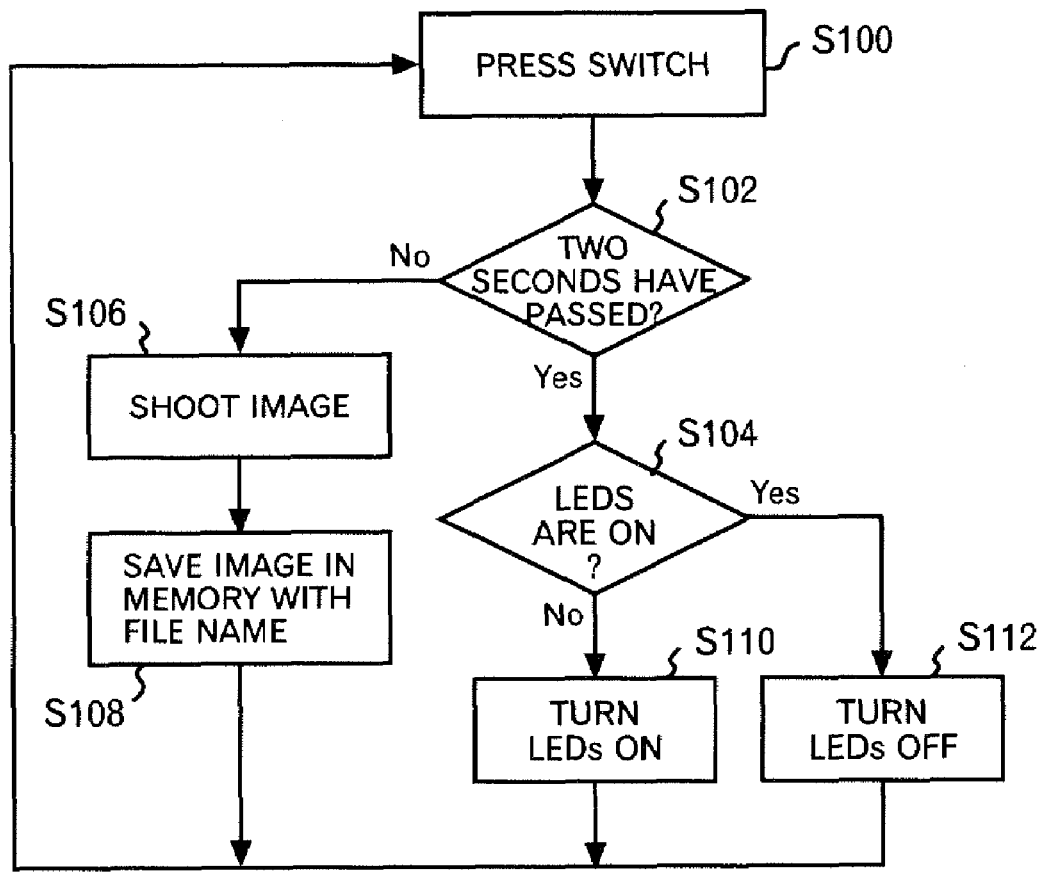
FIG. 6 is a diagram showing an exemplary operational flow of the portable 2D bar code bookmarker of the present invention.

FIG. 6 is a diagram showing an exemplary operational flow of the portable 2D bar code bookmarker of the present invention.

In S100, the switch is pressed with a user operation on the switch 18. In S102, if the switch is held down for two seconds (an exemplary predetermined duration) or more, it is determined that the switch is pressed for a long duration. The process proceeds to S104, where if the LEDs 15 are off, the LEDs 15 are kept on in S10. If the LEDs 15 are already on, the LEDs 15 are turned off in S112.

If the switch is not held down for two seconds or more in S102, it is determined that the switch is pressed for a short duration. The process proceeds to S106, where an image is shot. A press of a short duration less than two seconds while the LEDs 15 are on triggers a camera shutter, and the shutter can be released any number of times. For user's convenience, a sound may be made when the shutter operates. The process proceeds to S108, where each shot image is given a file name (e.g., an automatically assigned name) and saved in the memory.

Figure 7:
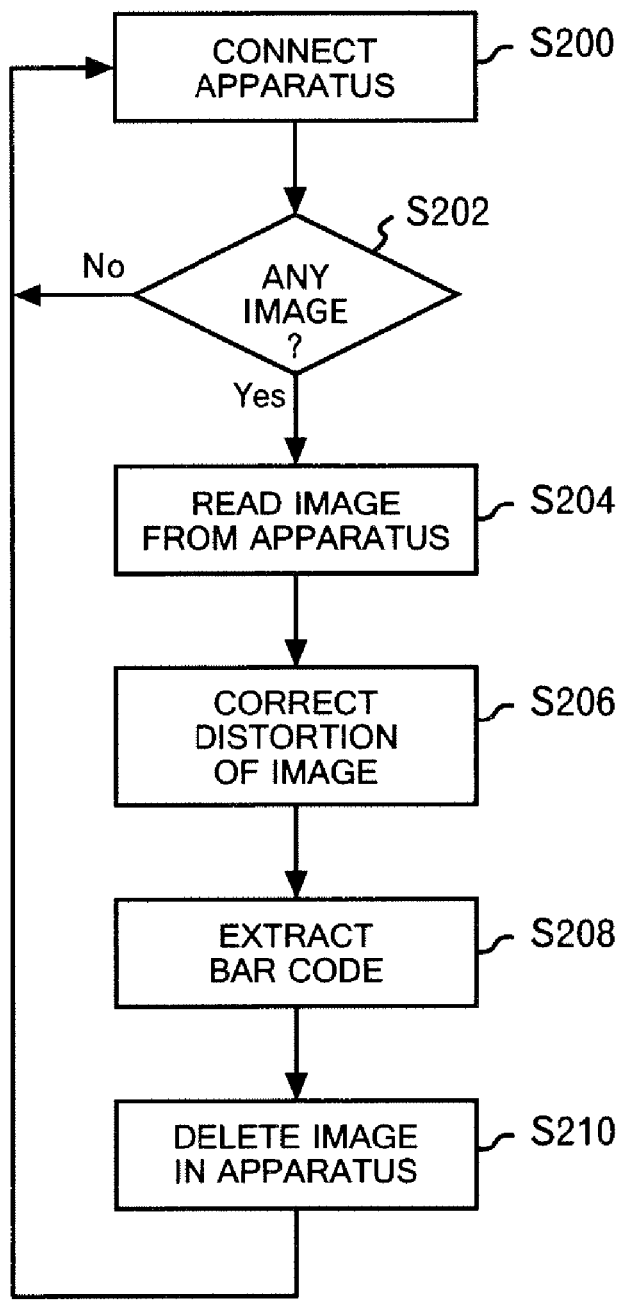
FIG. 7 is a diagram showing an exemplary operational flow of the bookmarker software that operates once the portable 2D bar code bookmarker is connected to a PC according to the present invention.

FIG. 7 is a diagram showing an exemplary operational flow of the bookmarker software that operates once the portable 2D bar code bookmarker is connected to the PC according to the present invention.

Once the apparatus of the portable 2D bar code bookmarker 10 is connected to the USB port 32 or the like of the PC 30 in S200, it is determined whether an image is saved in the memory in S202. At this point, it may be determined as Yes only if a new image has been added in comparison with the point of the last connection. If an image is saved in the memory, the image is read from the apparatus of the portable 2D bar code bookmarker 10 in S204. A QR code is extracted in S208. When the shot image is no more needed, such as when the extracted QR code is successfully decoded, the corresponding image may be deleted from the memory in the apparatus of the portable 2D bar code bookmarker 10 in S210 to save the memory capacity.

In the present disclosure, the methods disclosed may be implemented as sets of instructions or software readable by a device. Further, it is understood that the specific order or hierarchy of steps in the methods disclosed are examples of exemplary approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

What is claimed is:

1. An apparatus capable of shooting an invisible image luminously visualized on an object while observing the position of the invisible image latent on the object, comprising:

a base body that can be placed directly on the object;

an observation window that extends from the base body and can take ambient light therein to allow a visible image existing on the object to be directly observed there through;

a light-emitting body that emits invisible light to luminously visualize the invisible image;

a mirror;

an optical system; and a camera fixedly set with respect to the base body, wherein
the observation window is set to allow the invisible image luminously visualized on the object by the light from the light-emitting body to be directly observed there through from at least one direction,
the mirror is set to reflect images incident from a direction different from the at least one direction including the luminously visualized invisible image and guide a mapping image to the optical system, and
the optical system is set to guide the mapping image guided from the mirror to the camera.

2. The apparatus according to claim 1, wherein spatial positioning between the mirror and the light-emitting body is set in such a manner that the light emitted from the light-emitting body is directed to the mirror and reflected so that the light can spread on part of the object that is covered by the observation window when the body is placed directly on the object.

3. The apparatus according to claim 1, further comprising a memory that can accumulate the mapping image shot by the camera.

4. The apparatus according to claim 3, further comprising an output connector for connecting with an external device, wherein
the shot mapping image accumulated in the memory can be transferred to the external device.

5. The apparatus according to claim 1, further comprising a user-operated switch, wherein
pressing the switch for more than a predetermined duration causes the light-emitting body to keep illuminating, and
pressing the switch for less than the predetermined duration causes shooting by the camera.

6. The apparatus according to claim 1, wherein
the observation window is hinged on the base body, and
the optical system is set to be capable of guiding even an image not guided from the mirror to the camera as the observation window is tipped up with the hinge.

7. A method for using the apparatus according to claim 1 to shoot an invisible image luminously visualized on an object, comprising:
emitting invisible light if a user presses the switch for more than a predetermined duration; and
shooting the luminously visualized invisible image if the user presses the switch for less than the predetermined duration.

8. The method according to claim 7, further comprising accumulating a mapping image shot by the camera in the memory.

9. The method according to claim 8, further comprising transferring the shot mapping image accumulated in the memory to an external device.

10. A method for using the apparatus according to claim 1 to reconstruct an invisible image luminously visualized on an object, comprising:
receiving a shot mapping image including the luminously visualized invisible image from the apparatus; and
reconstructing the invisible image on the object from the received mapping image.

* * * * *